(12) United States Patent
Liao et al.

(10) Patent No.: US 8,294,962 B2
(45) Date of Patent: Oct. 23, 2012

(54) METHOD OF CONVEYING DOCUMENTS FOR AUTOMATIC DOCUMENT FEEDER

(75) Inventors: Wen-Ching Liao, Taipei (TW); Lung Chen, Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 444 days.

(21) Appl. No.: 12/752,089

(22) Filed: Mar. 31, 2010

(65) Prior Publication Data

US 2011/0243627 A1    Oct. 6, 2011

(51) Int. Cl.
*H04N 1/04* (2006.01)
*H04N 1/42* (2006.01)

(52) U.S. Cl. ......... 358/498; 358/474; 358/476; 358/496

(58) Field of Classification Search .................. None
See application file for complete search history.

*Primary Examiner* — Thierry Pham
(74) *Attorney, Agent, or Firm* — Lin & Associates IP, Inc.

(57) ABSTRACT

A method of conveying documents for an ADF includes steps of beginning a first conveying procedure of a next document after a preceding document passes through a scanning section during a first conveying procedure of the preceding document, performing a first inverting procedure and then beginning a second conveying procedure of the preceding document during the first conveying procedure of the next document, performing a first inverting procedure and then beginning a second conveying procedure of the next document during the second conveying procedure of the preceding document, performing a second inverting procedure and then beginning a third conveying procedure of the preceding document during the second conveying procedure of the next document, and performing a second inverting procedure and then beginning a third conveying procedure of the next document during the third conveying procedure of the preceding document. The next document begins the first conveying procedure during the preceding document performs the first conveying procedure to improve the efficiency and speed.

9 Claims, 21 Drawing Sheets

METHOD OF CONVEYING DOCUMENTS FOR AUTOMATIC DOCUMENT FEEDER

BACKGROUND OF THE INVENTION

1. Field of the Invention

The present invention relates to a method of processing documents, more specifically, to a method of conveying documents for an automatic document feeder.

2. The Related Art

Please refer to FIG. 20 to FIG. 41, they show a conventional method of conveying document for an automatic document feeder (ADF). The ADF 800 includes a case 802, a conveying path 804, an inverting path 806, a feeding tray 808, a picking up roller 810, a separating roller 812, a plurality of conveying rollers 814, a scanning section 816, a discharging roller 818 and a discharging tray 820.

The conveying path 804 defined in the case 802 includes an upstream feeding section 822 and a downstream discharging section 824 respectively connected to the outside of the case 802. The inverting path 806 defined in the case 802 branches from the downstream discharging section 824 and merges to a position of the conveying path 804 where arranged a downstream position relative to the separating roller 812 and a upstream position relative to the scanning section 816. Therefore, the inverting path 806 and a portion of the conveying path 804 are together formed of a loop.

The feeding tray 808 is positioned at the outside of the case 802 and adjacent to the upstream feeding section 822 for being stacked a bundle of documents P1, P2. The picking up roller 810 is positioned in the case 802 and at the upstream feeding section 822 for picking up the documents P1, P2 from the feeding tray 808 and conveying the documents P1, P2 into the conveying path 804.

The separating roller 812 is positioned at the upstream feeding section 822 and at a downstream position relative to the picking up roller 810. The separating roller 812 includes an active separating roller 826 and a driven separating roller 828 for separating the documents P1, P2 and conveying the documents P1, P2 one by one to the scanning section 816. Especially, the driven separating roller 828 can be replaced by a separating pad (not shown in figures).

The conveying rollers 814 are distributed along the conveying path 804 and the inverting path 806 for conveying the documents P1, P2 from the upstream feeding section 822, through the scanning section 816, to the downstream discharging section 824. The scanning section 816 is positioned between the upstream feeding section 822 and the downstream discharging section 824 for scanning the documents P1, P2.

The discharging roller 818 is positioned at the downstream discharging section 824 for discharging the documents P1, P2 from the conveying path 804. The discharging tray 820 is positioned at the outside of the case 802 and adjacent to the downstream discharging section 824 for stacking the scanned documents P1, P2. Especially, the discharging tray 820 is positioned below the feeding tray 808.

The conventional method of conveying documents P1, P2 for the ADF 800 includes the following steps:

Step 902: Stacking the documents P1, P2 on the feeding tray 808 (shown in FIG. 20);

Step 904: Picking up the document P1 from the feeding tray 808 by the picking up roller 810 and conveying the document P1 into the conveying path 804 by the separating roller 812 positioned at the upstream feeding section 822 (shown in FIG. 21);

Step 906: Conveying the document P1 from the upstream feeding section 822 and passing through the scanning section 816 by the conveying rollers 814 for scanning a front surface of the document P1 (shown in FIG. 22);

Step 908: Conveying the document P1 from the scanning section 816 to the discharging roller 818 positioned at the downstream discharging section 824 by the conveying rollers 814, and then discharging the document P1 from the downstream discharging section 824 to arrange a leading end of the document P1 (arrow of document P1 in FIG. 23) at the outside of the case 802 by the clockwise rotation of the discharging roller 818, and then clipping a trailing end of the document P1 by stopping rotating of the discharging roller 818 (shown in FIG. 23);

Step 910: Conveying the document P1 into the downstream discharging section 824 by the counterclockwise rotation of the discharging roller 818 (shown in FIG. 24);

Step 912: Conveying the document P1 into the inverting path 806 for inverting the document P1 to arrange the leading thereof to become the trailing end (the trailing end of the document P1 becomes leading end shown as arrow in FIG. 25), and the front surface become a rear surface (shown in FIG. 25);

Step 914: Conveying the document P1 into the conveying path 804 and passing through the scanning section 816 again for scanning the rear surface of the document P1 (shown in FIG. 26);

Step 916: Conveying the document P1 from the scanning section 816 to the downstream discharging section 824 by the conveying rollers 814, and then discharging the leading end of the document P1 at the outside the case 802 by the clockwise rotation of the discharging roller 818, meanwhile, picking up the document P2 and conveying the document P2 into the upstream feeding section 822 by the picking up roller 810, and then clipping the document P2 to retain the document P2 in the upstream feeding section 822 by the separating roller 812 (shown in FIG. 27);

Step 918: Clipping the trailing end of the document P1 by stopping the rotation of the discharging roller 818, and then conveying the document P1 into the inverting path 806 for inverting the document P1 to arrange the leading end thereof to become the trailing end, and the front surface to become the rear surface again, meanwhile, keeping clipping the document P2 to retain the document P2 in the upstream feeding section 822 by the separating roller 812 (shown in FIG. 28);

Step 920: Conveying the document P1 into the conveying path 804 through the inverting path 806 again and passing through the scanning section 816, meanwhile, performing a non-scanning process of the front surface of the document P1, and conveying the document P2 to the scanning section 816 after the trailing end of the document P1 is conveyed to depart from the inverting path 806 by the conveying rollers 814 (shown in FIG. 29);

Step 922: Conveying the document P1 from the scanning section 816 to the discharging roller 818 positioned in the downstream discharging section 824 by the conveying rollers 814, meanwhile, conveying the document P2 from the upstream feeding section 822 to the scanning section 816 (shown in FIG. 30);

Step 924: Discharging the document P1 from the downstream discharging section 824 of the conveying path 804 by the discharging roller 818, meanwhile, conveying the document P2 to pass through the scanning section 816 for scanning a front surface of the document P2 (shown in FIG. 31);

Step 926: Discharging the document P1 from the case 802 to be putted on the discharging tray 820, meanwhile, conveying the document P2 from the scanning section 816 to the downstream discharging section 824 by the conveying rollers 814, and then discharging a leading end of the document P2 at the outside the case 802 by the clockwise rotation of the discharging roller 818, and then clipping a trailing end of the document P2 by stopping rotating of the discharging roller 818 (shown in FIG. 32);

Step 928: Conveying the document P2 into the downstream discharging section 824 by the counterclockwise rotation of the discharging roller 818 (shown in FIG. 33);

Step 930: Conveying the document P2 into the inverting path 806 for inverting the document P2 to arrange the leading thereof to become the trailing end, and the front surface to become a rear surface (shown in FIG. 34);

Step 932: Conveying the document P2 into the conveying path 804 and passing through the scanning section 816 again for scanning the rear surface of the document P2 (shown in FIG. 35);

Step 934: Conveying the document P2 from the scanning section 816 to the downstream discharging section 824 by the conveying rollers 814, and then discharging the leading end of the document P2 at the outside the case 802 by the clockwise rotation of the discharging roller 818, meanwhile, picking up a next document P3 and conveying the document P3 into the upstream feeding section 822 by the picking up roller 810, and then clipping the document P3 to retain the document P3 in the upstream feeding section 822 by the separating roller 812 (shown in FIG. 36);

Step 936: Clipping the trailing end of the document P2 by stopping the rotation of the discharging roller 818, and then conveying the document P2 into the inverting path 806 for inverting the document P2 to arrange the leading thereof to become the trailing end, and the front surface to become the rear surface again, meanwhile, keeping clipping the document P3 to retain the document P3 in the upstream feeding section 822 by the separating roller 812 (shown in FIG. 37);

Step 938: Conveying the document P2 into the conveying path 804 through the inverting path 806 again and passing through the scanning section 816, meanwhile, performing a non-scanning process of the front surface of the document P2, meanwhile, conveying the document P3 from the upstream feeding section 822 to the scanning section 816 after the trailing end of the document P2 is conveyed to depart from the inverting path 806 by the conveying rollers 814 (shown in FIG. 38);

Step 940: Conveying the document P2 from the scanning section 816 to the discharging roller 818 positioned in the downstream discharging section 824 by the conveying rollers 814, meanwhile, keeping conveying the document P3 from the upstream feeding section 822 to the scanning section 816 (shown in FIG. 39);

Step 942: Discharging the document P2 from the downstream discharging section 824 of the conveying path 804 by the discharging roller 818, meanwhile, conveying the document P3 to pass through the scanning section 816 for scanning a front surface of the document P3 (shown in FIG. 40); and Step 944: Discharging the document P2 from the case 802 of the ADF 800 to be putted on the discharging tray 820, meanwhile, conveying the document P3 from the scanning section 816 to the downstream discharging section 824 by the conveying rollers 814, and then discharging a leading end of the document P3 at the outside the case 802 by the clockwise rotation of the discharging roller 818, and then clipping a trailing end of the document P3 by stopping rotating of the discharging roller 818 (shown in FIG. 41).

Therefore, procedure of the document P3 and a next document P4 is similar as above steps. As described above, the documents P1, P2 are performed three times the conveying procedures to be conveyed to pass through the scanning section 814 and performed two times the inverting procedures to be conveyed through the inverting path 806 for arranging the orientation of the scanned documents P1, P2 on the discharging tray 820 to be same with the orientation of the non-scanned documents P1, P2 on the feeding tray 808.

However, a next document (document P2) is waited in the upstream feeding section 822, when a preceding document (document P1) is performed with the first conveying procedure, the first inverting procedure, the second conveying procedure and the second converting procedure. It is inefficient and wastes long time for waiting the two times the conveying procedures and two times the inverting procedures of the preceding document.

SUMMARY OF THE INVENTION

An object of the present invention is to provide a method of conveying documents for an ADF.

According to the invention, the ADF includes a case, a conveying path, an inverting path and a scanning section. The conveying path is defined in the case and defines an upstream feeding section and a downstream discharging section respectively connected to the outside of the case. The inverting path is defined in the case and branches from the downstream discharging section and merges to a merging position arranged at a downstream position relative to the upstream feeding section and adjacent to the upstream feeding section.

The scanning section is positioned at a side of the conveying path and between the merging position and the downstream discharging section. The ADF conveys a preceding document and a next document to perform three times the conveying procedures for conveying the preceding document and the next document from the merging position, through the scanning section and to the downstream discharging section and two times the inverting procedures for conveying the preceding document and the next document from the downstream discharging section, through the inverting path and to the merging position.

The method of conveying documents for the ADF is described hereinafter and in order. A first conveying procedure of the preceding document will begin. A first conveying procedure of the next document will begin after the preceding document passes through the scanning section during the first conveying procedure. After a first inverting procedure of the preceding document has been performed, then a second conveying procedure of the preceding document will begin during the first conveying procedure of the next document.

A first inverting procedure of the next document has performed and then a second conveying procedure of the next document will begin during the second conveying procedure of the preceding document. A second inverting procedure of the preceding document has performed and then a third conveying procedure of the preceding document will begin during the second conveying procedure of the next document. A second inverting procedure of the next document has performed and then a third conveying procedure of the next document will begin during the third conveying procedure of the preceding document.

Since, the next document begins the first conveying procedure during the first conveying of the preceding document. It shortens the waiting time of feeding the next document and improves the efficiency and speed of the ADF.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENT

Figure 1:
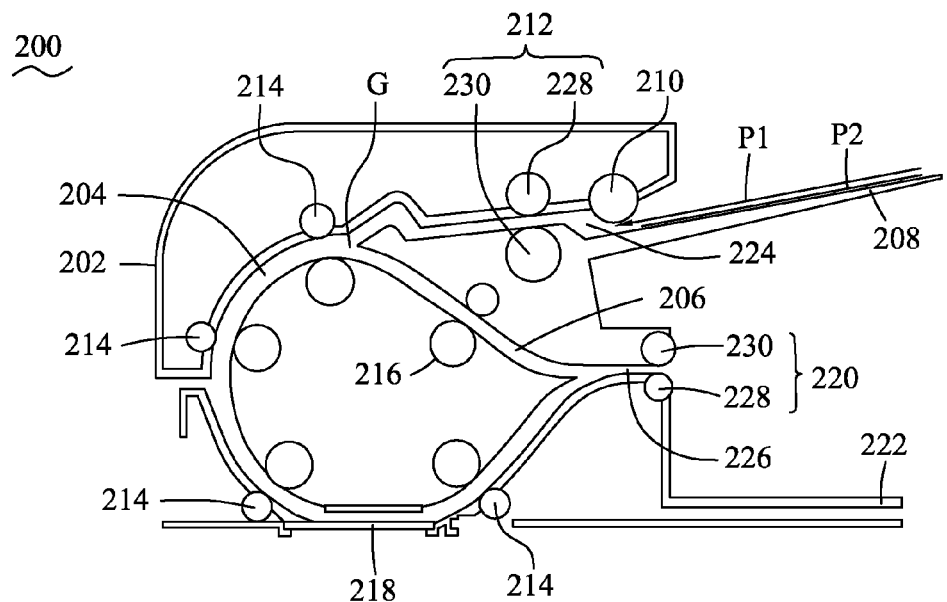
FIG. 1 to FIG. 19 show a method of conveying documents for an ADF according to the present invention.
Figure 2:
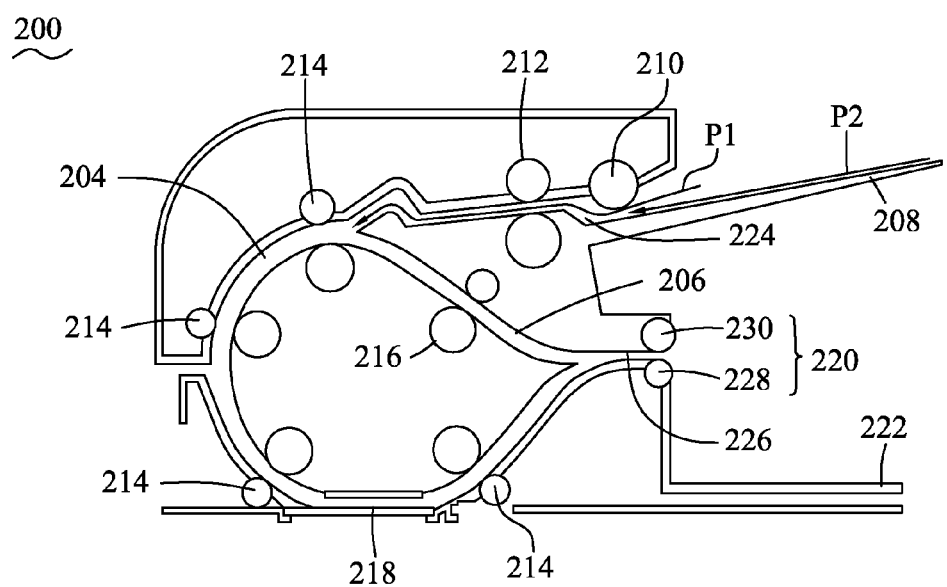
Figure 3:
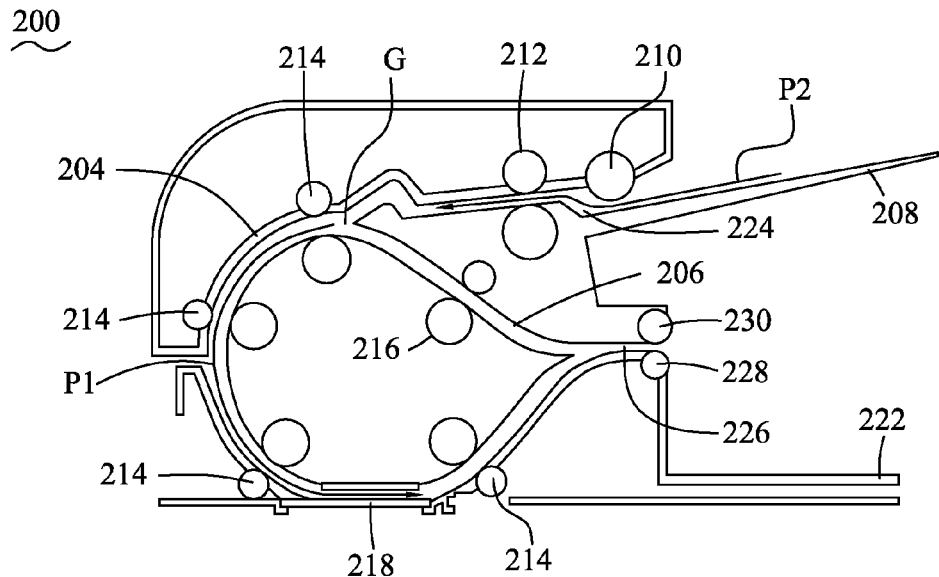
Figure 4:
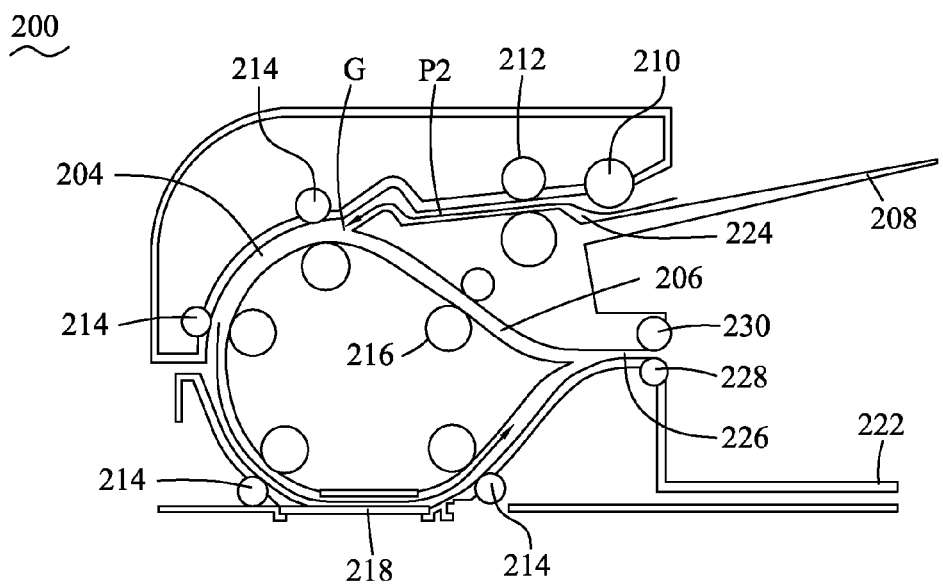
Figure 5:
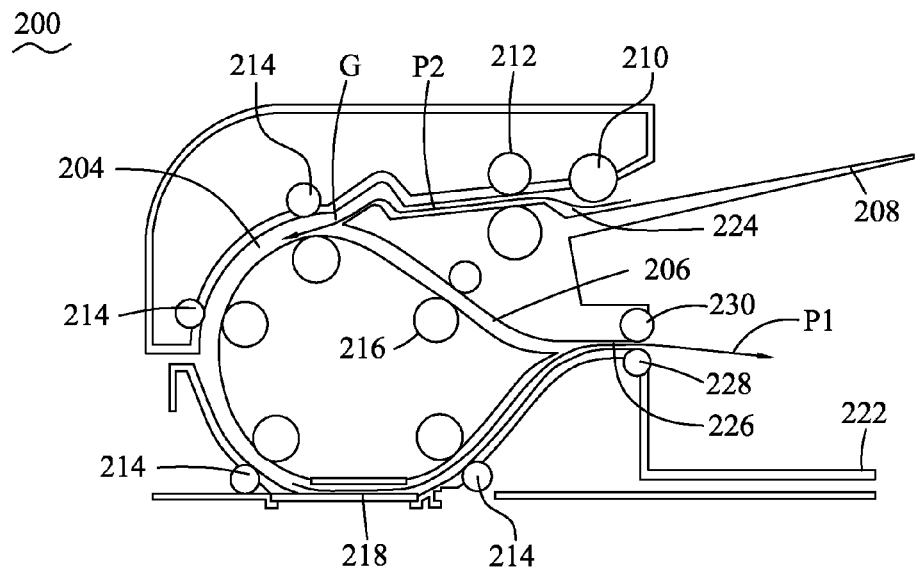
Figure 6:
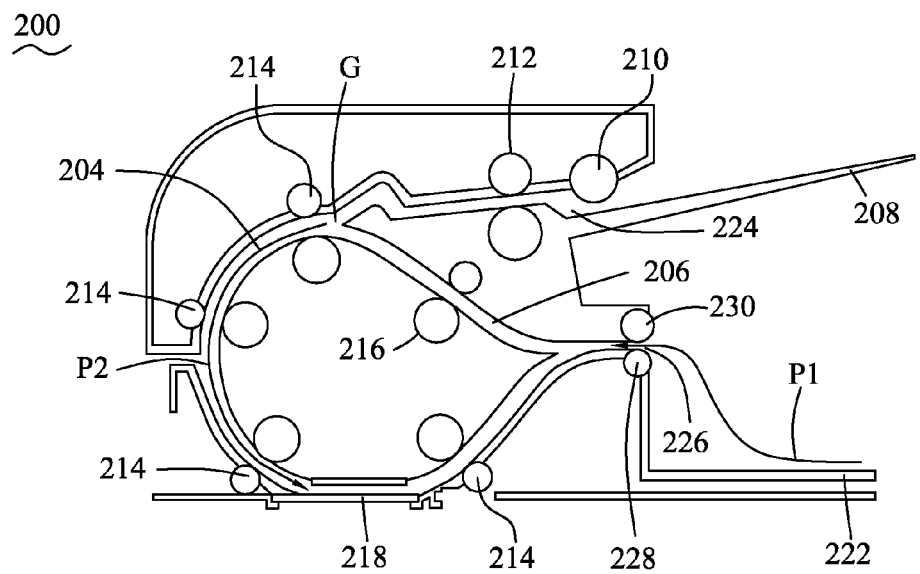
Figure 7:
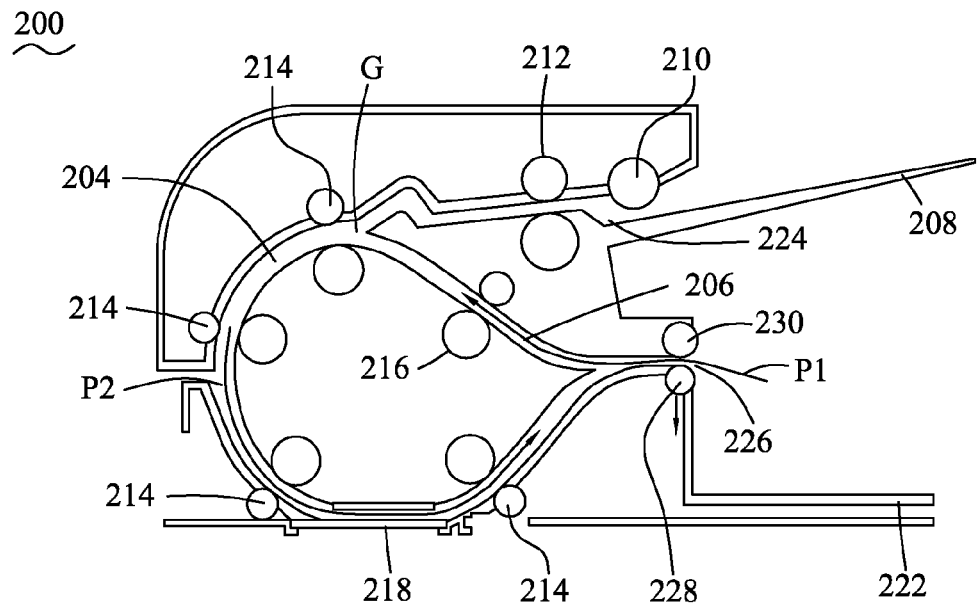
Figure 8:
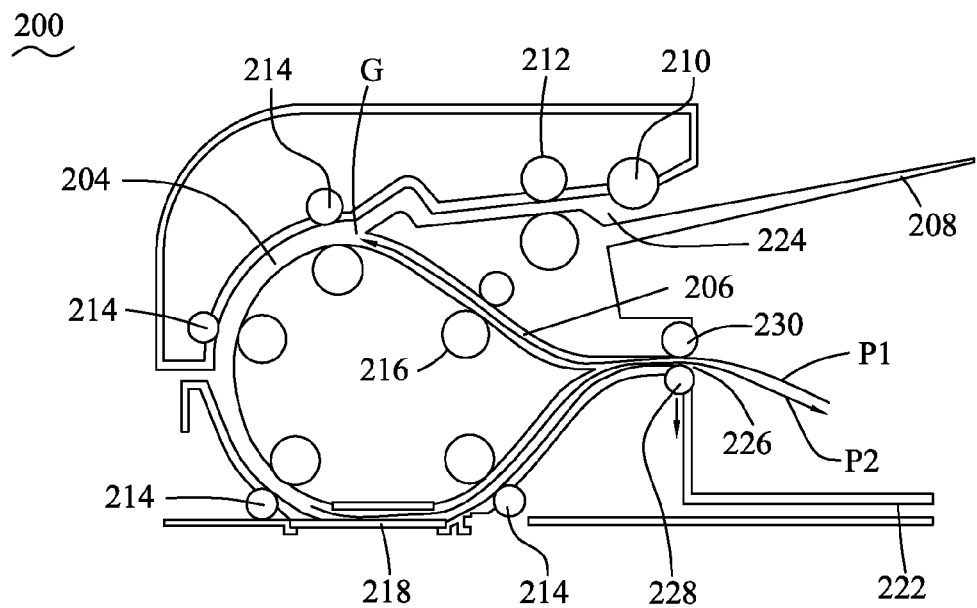
Figure 9:
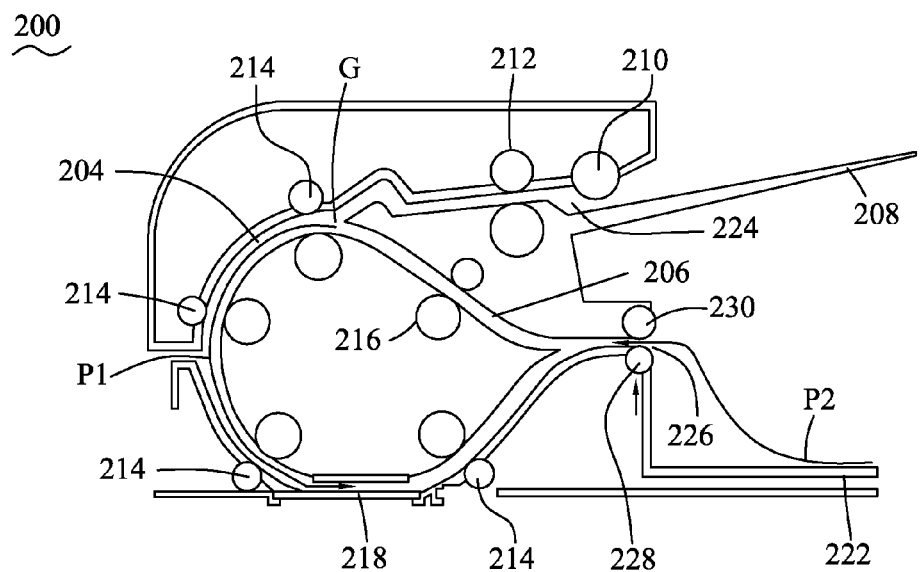
Figure 10:
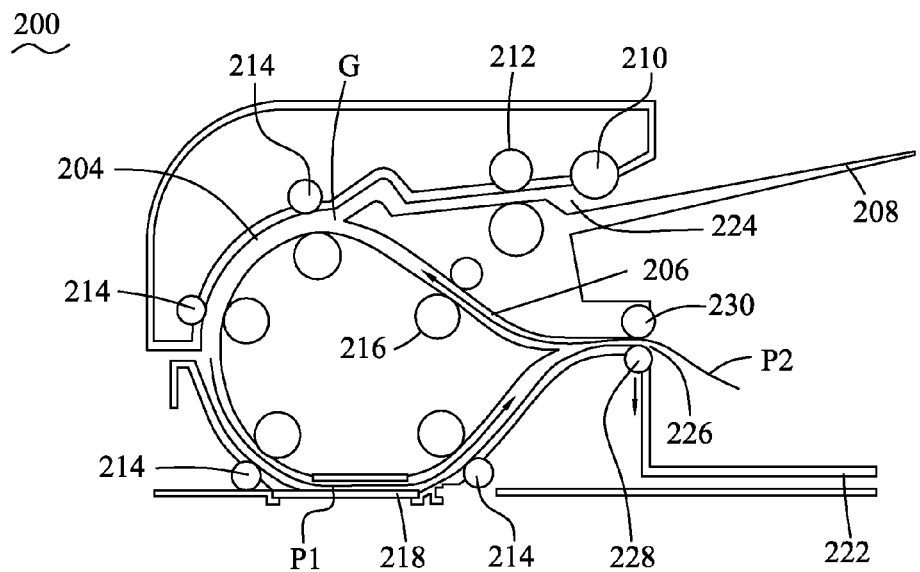
Figure 11:
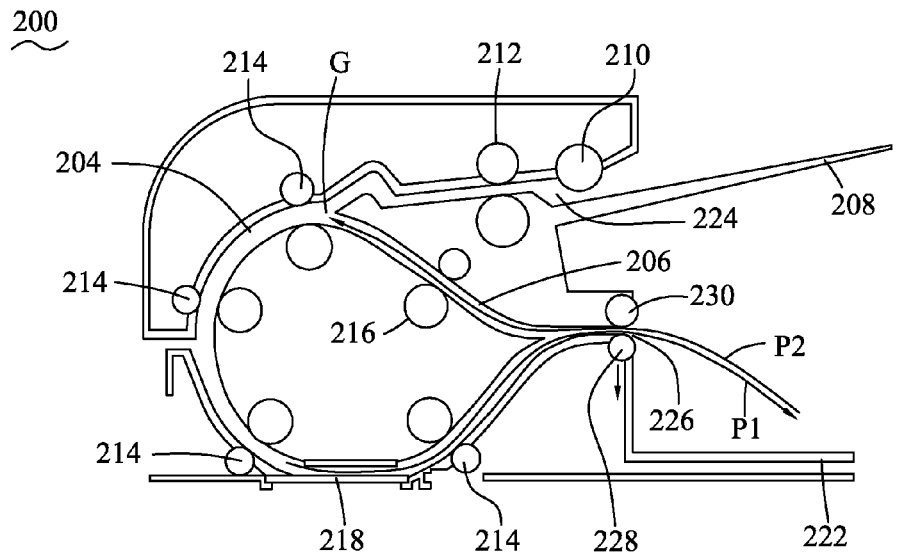
Figure 12:
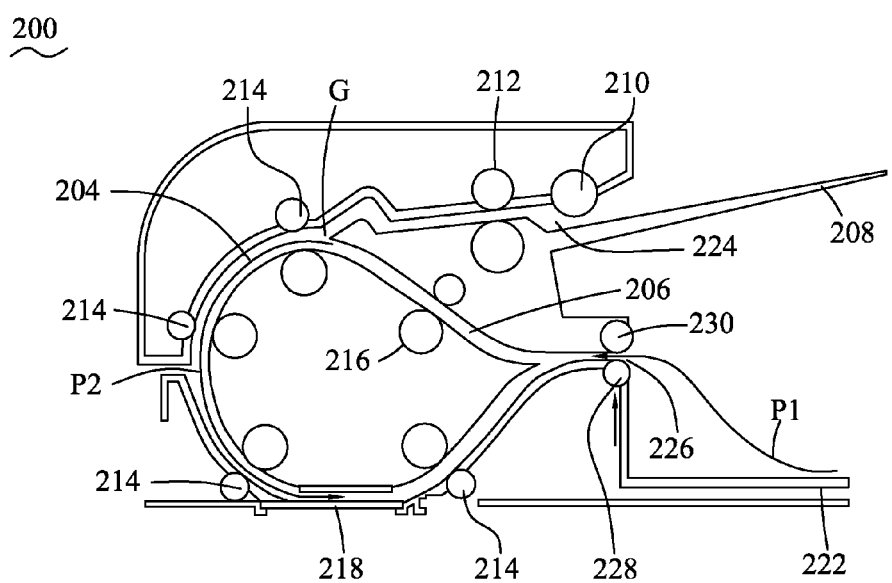
Figure 13:
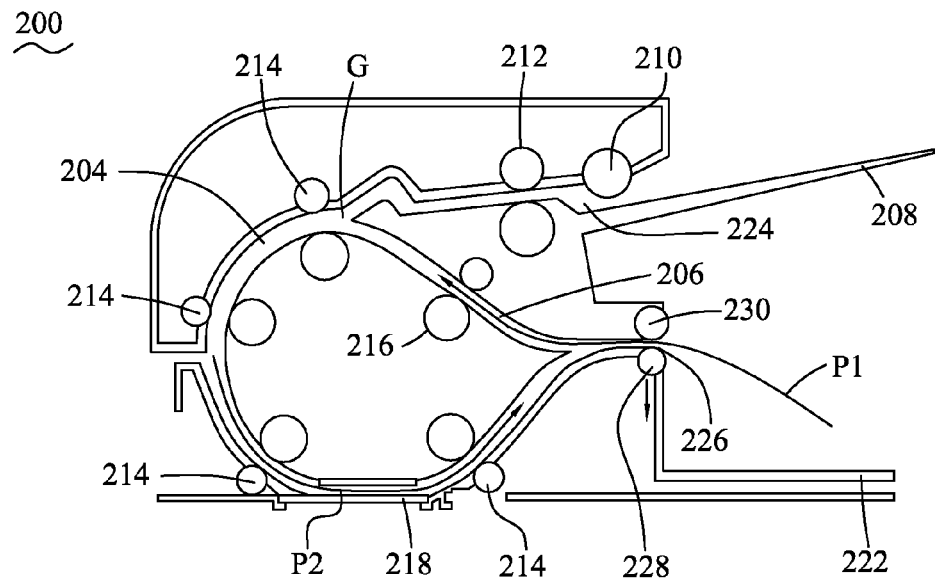
Figure 14:
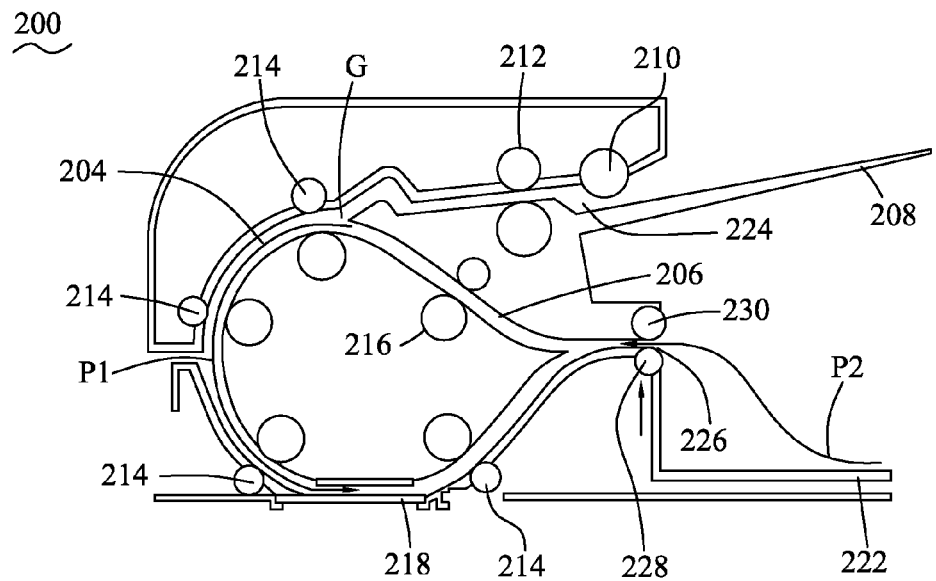
Figure 15:
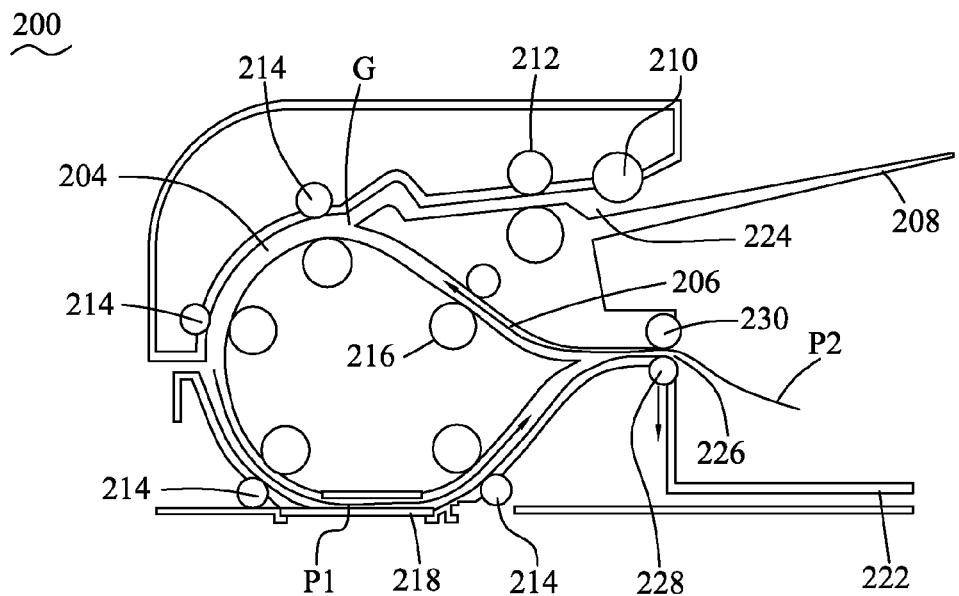
Figure 16:
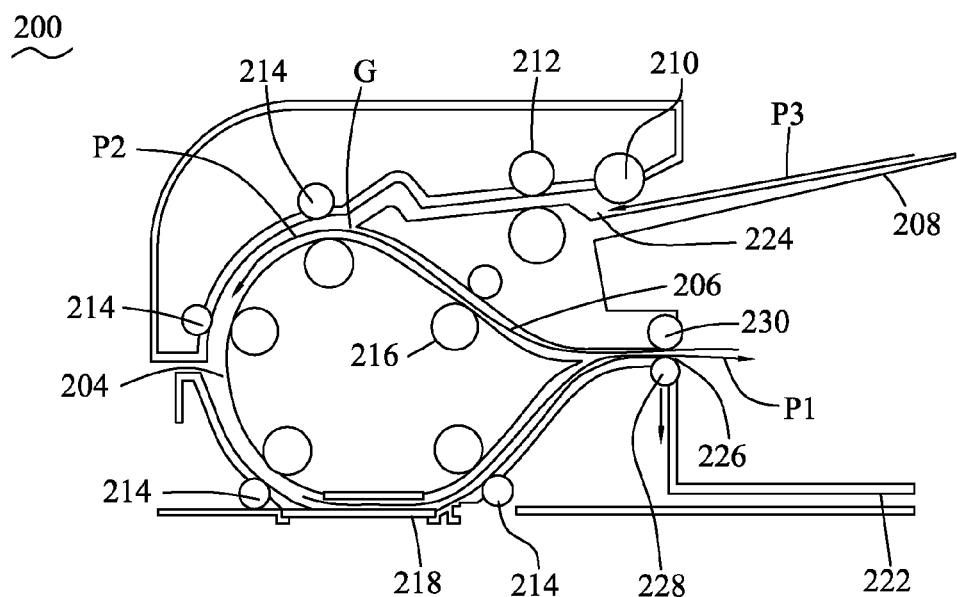
Figure 17:
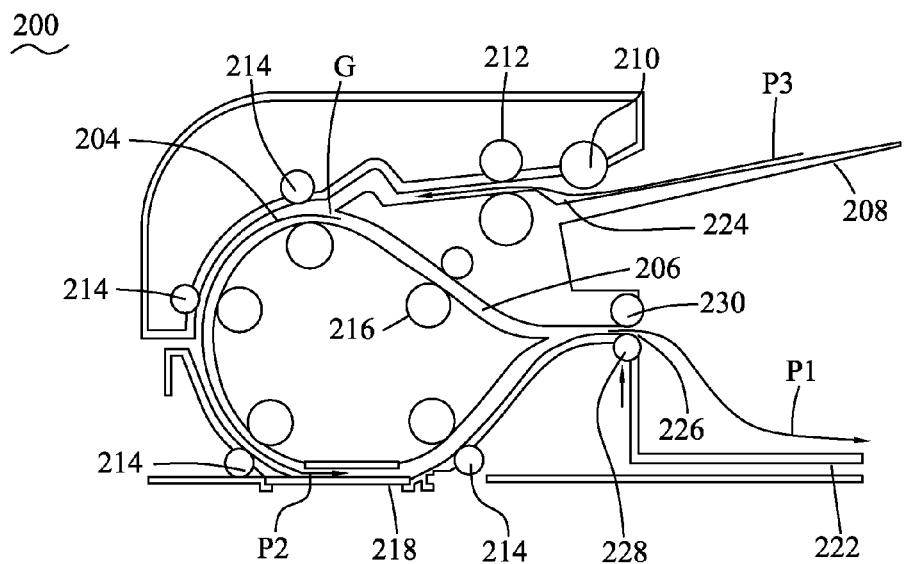
Figure 18:
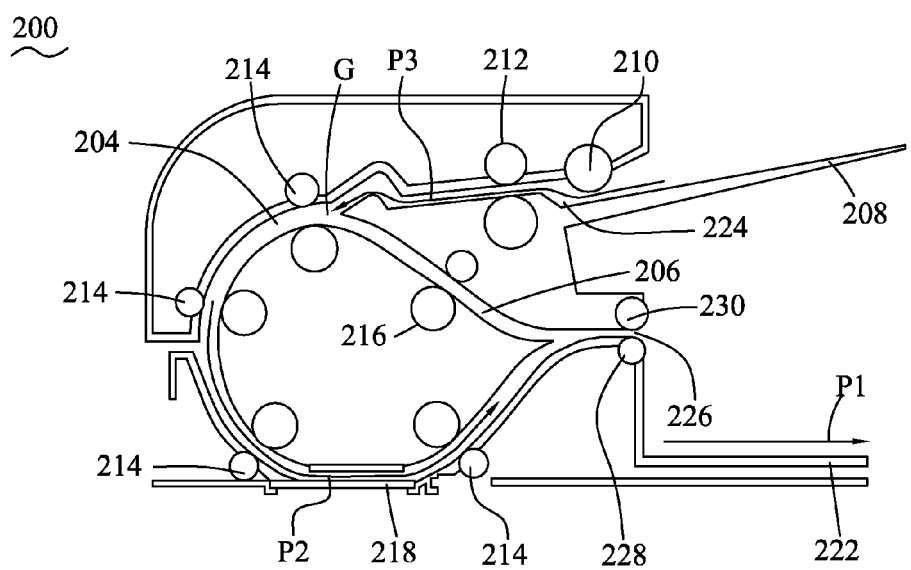
Figure 19:
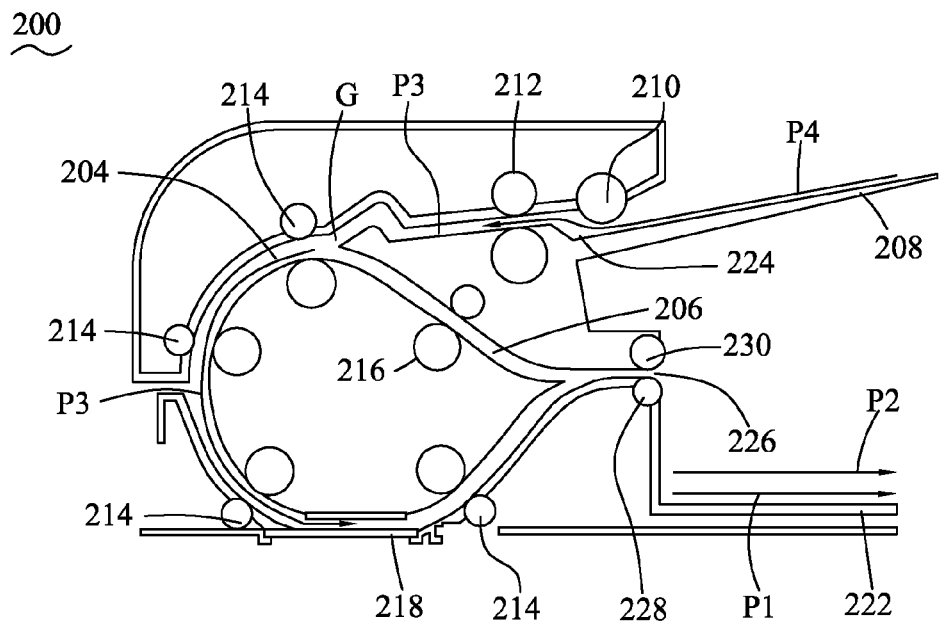
Figure 20:
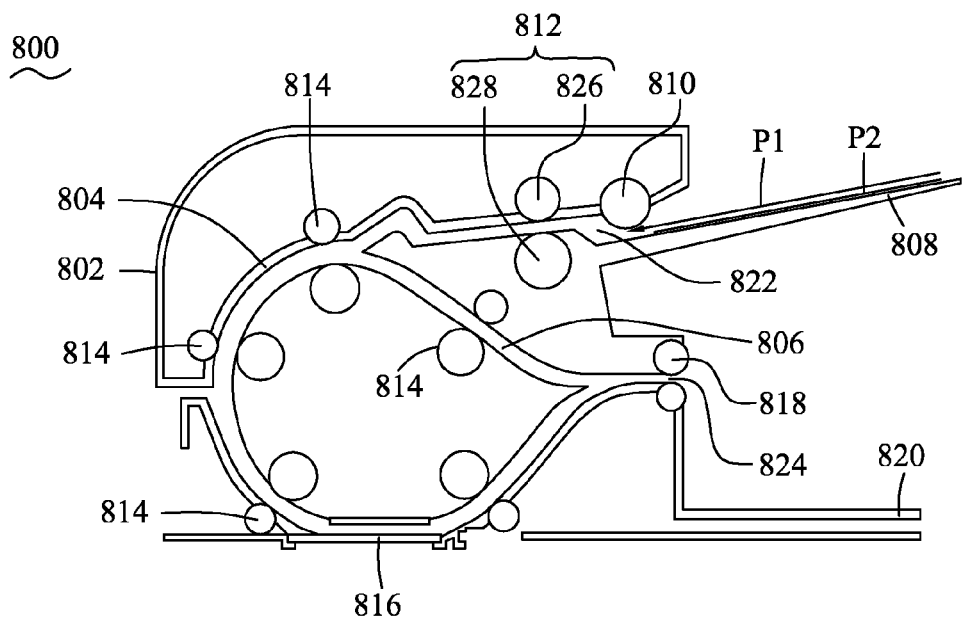
FIG. 20 to FIG. 41 show a conventional method of conveying document for an ADF.
Figure 21:
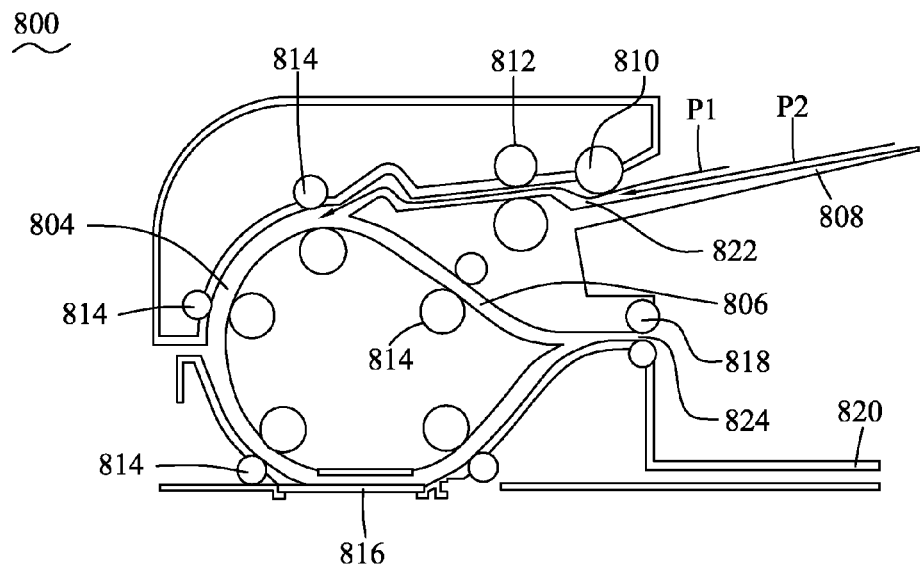
Figure 22:
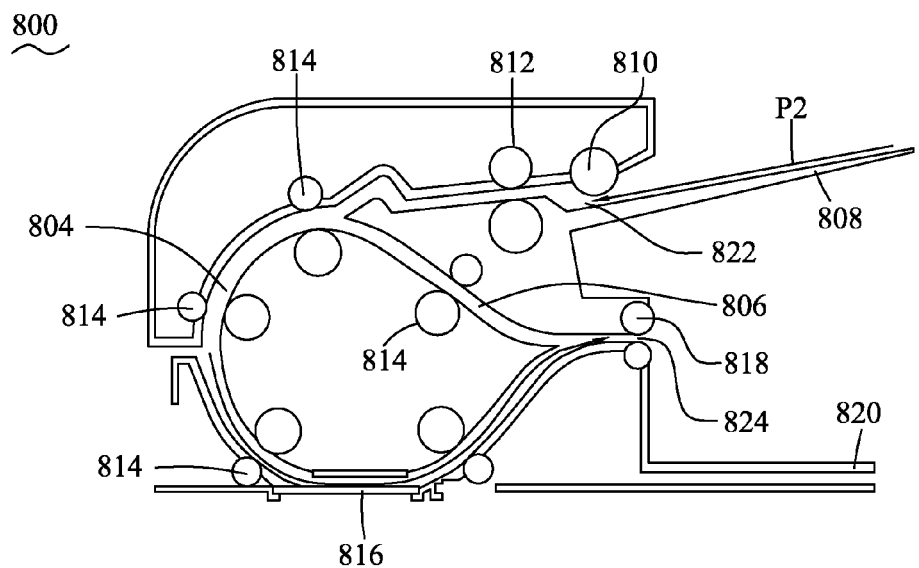
Figure 23:
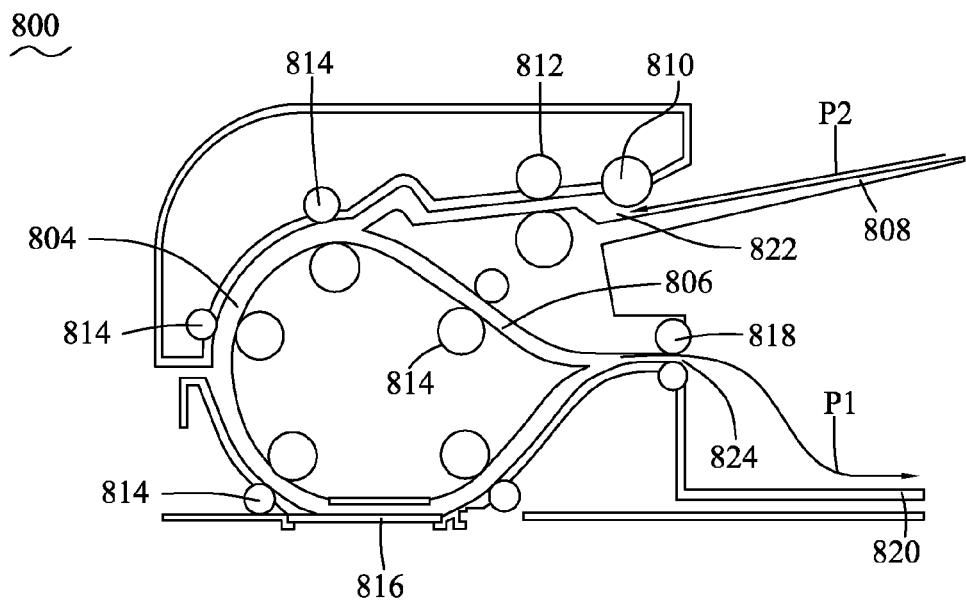
Figure 24:
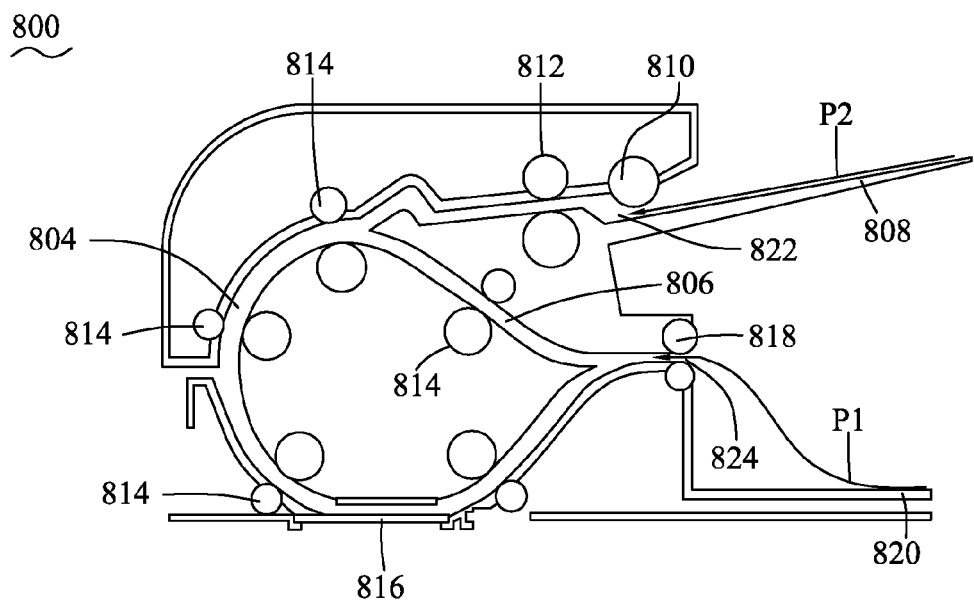
Figure 25:
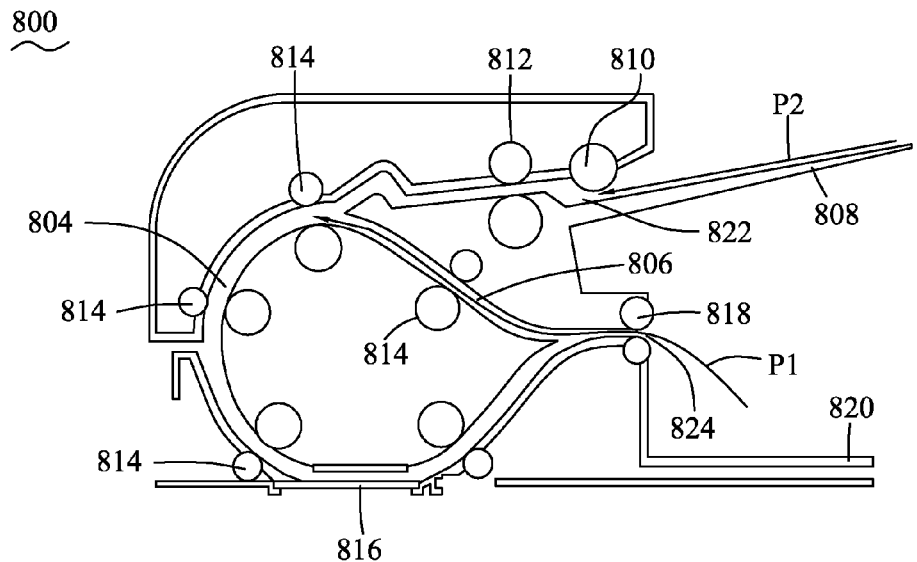
Figure 26:
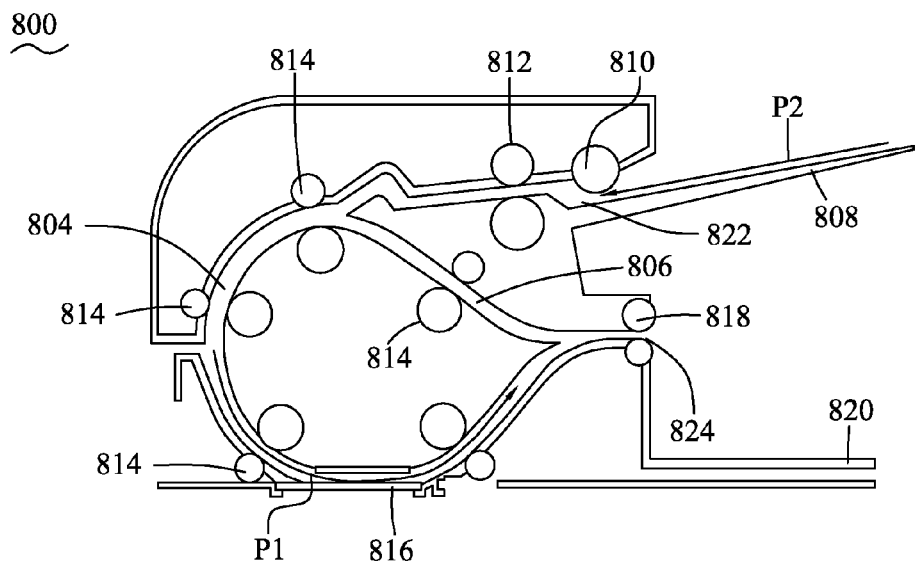
Figure 27:
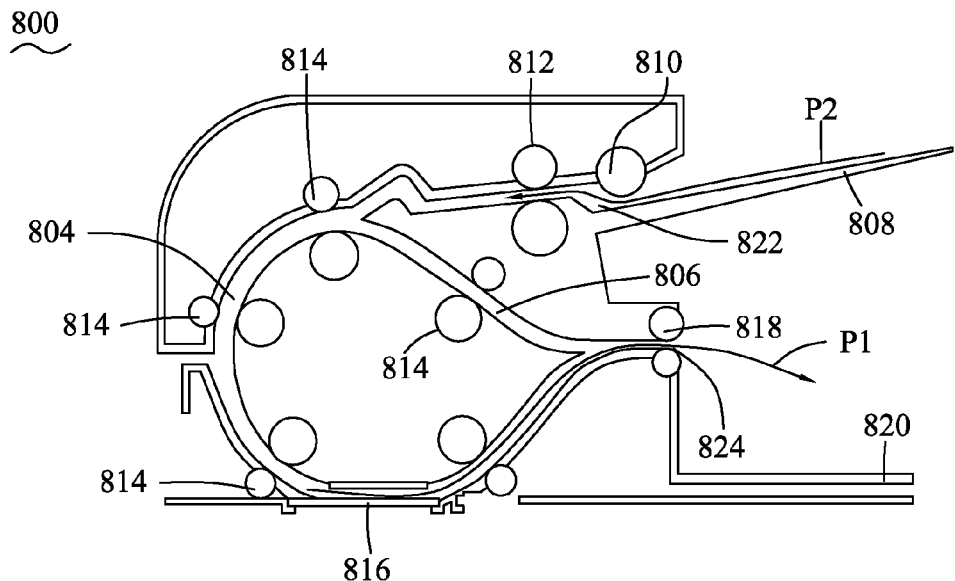
Figure 28:
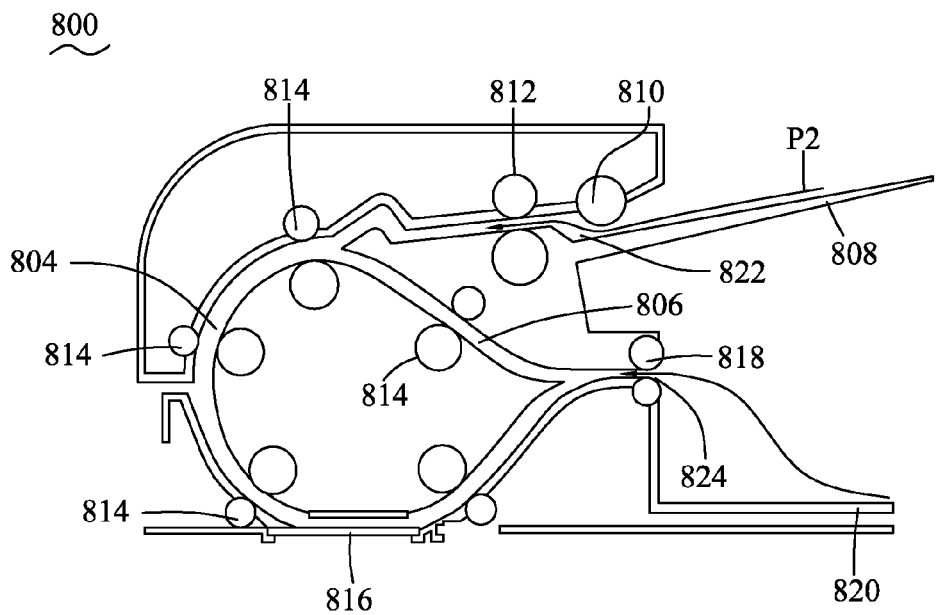
Figure 29:
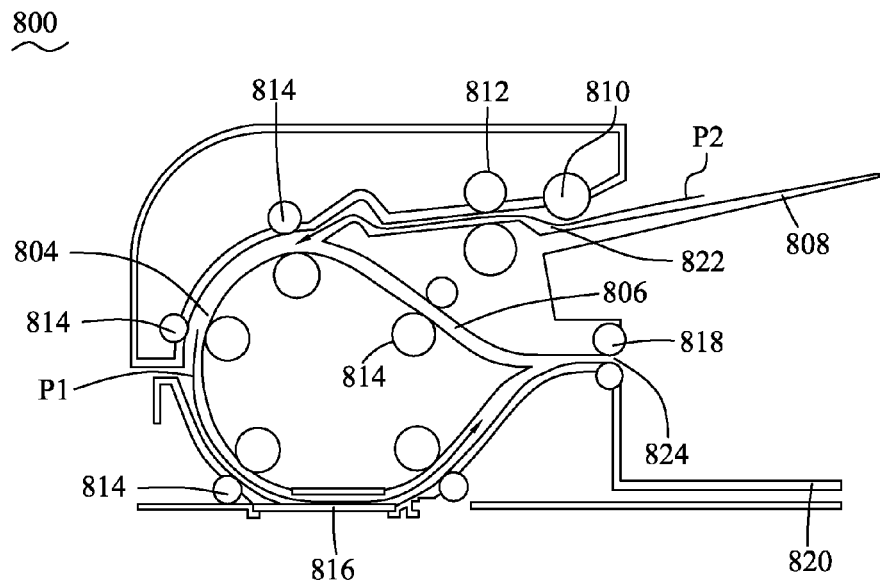
Figure 30:
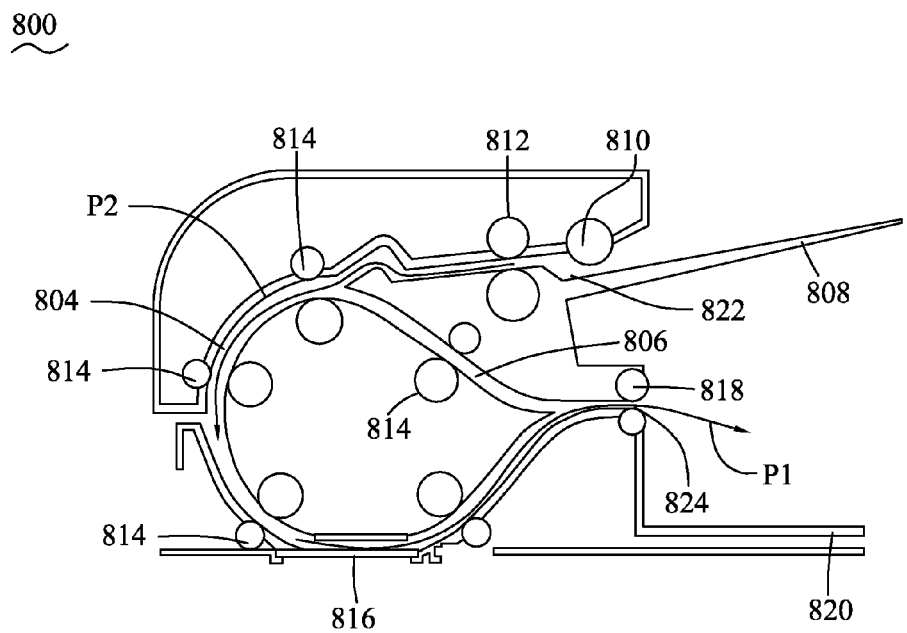
Figure 31:
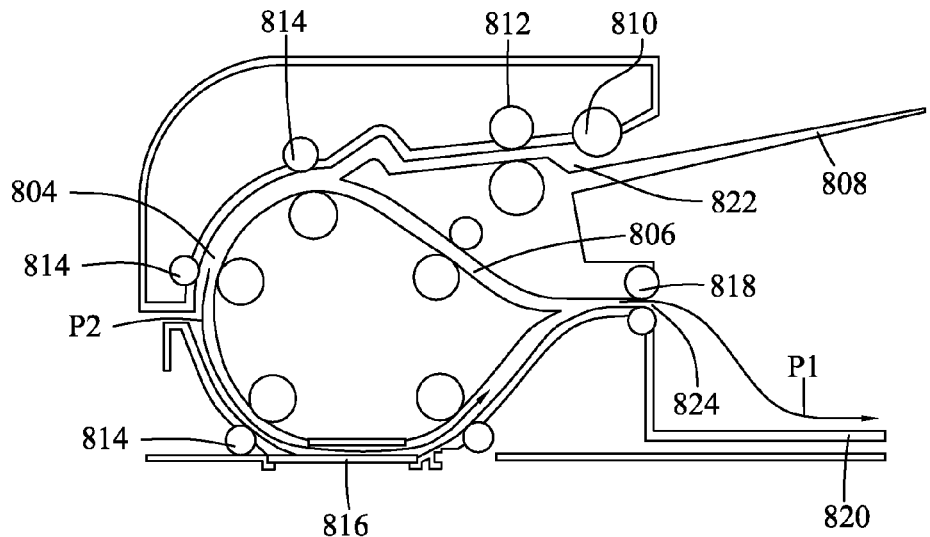
Figure 32:
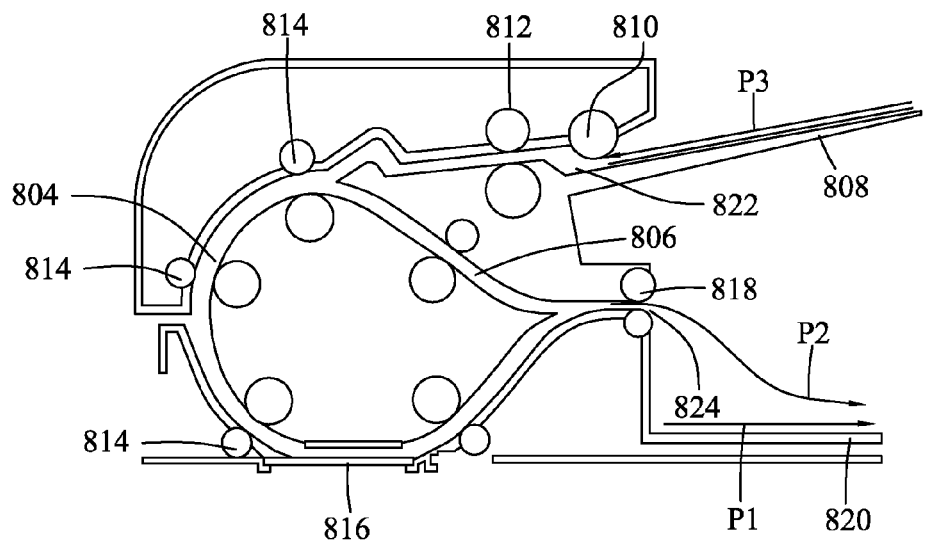
Figure 33:
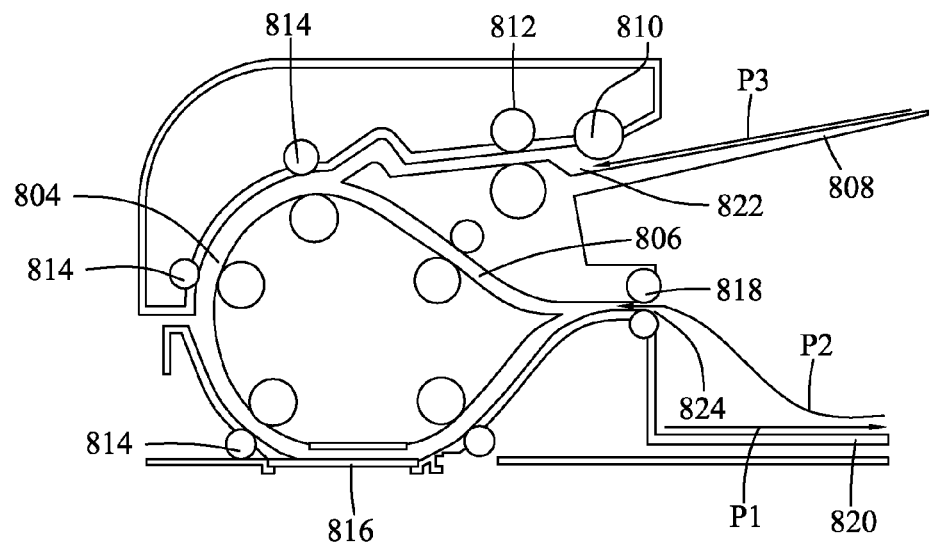
Figure 34:
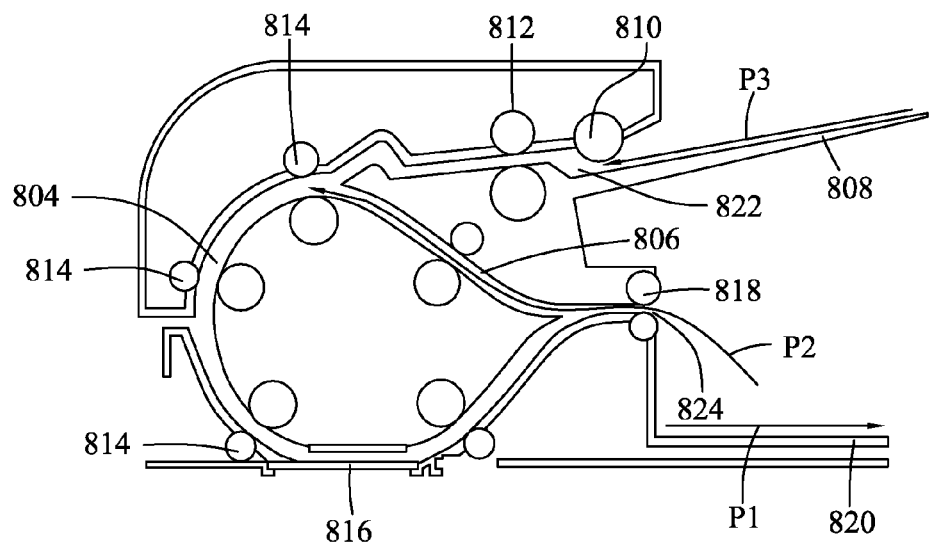
Figure 35:
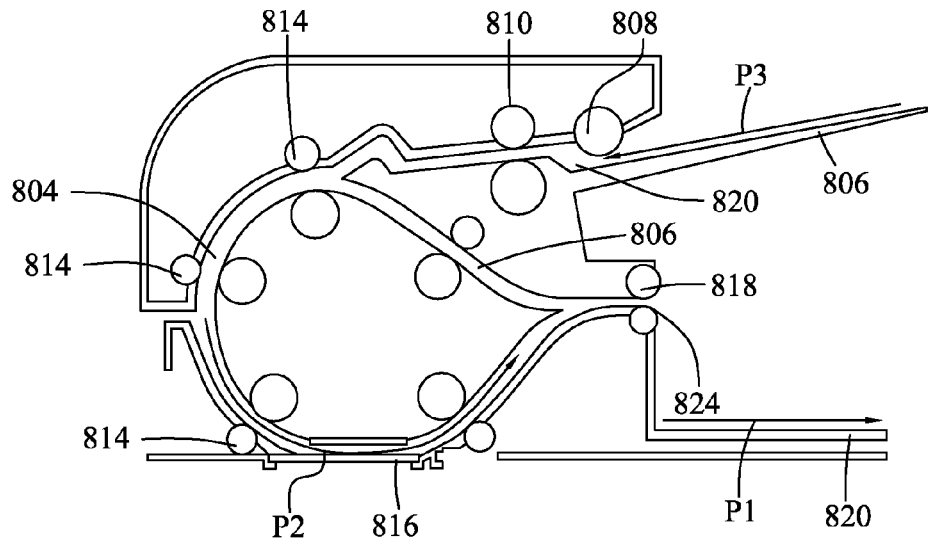
Figure 36:
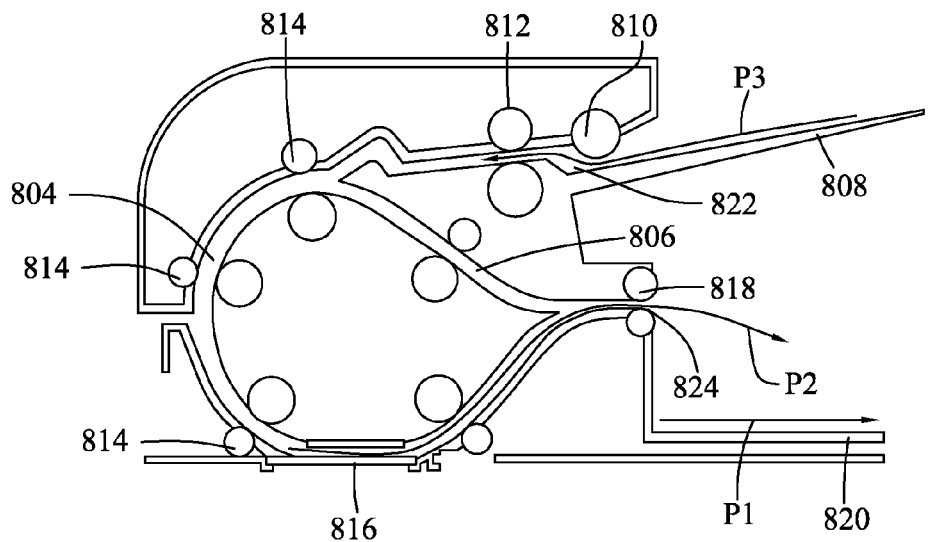
Figure 37:
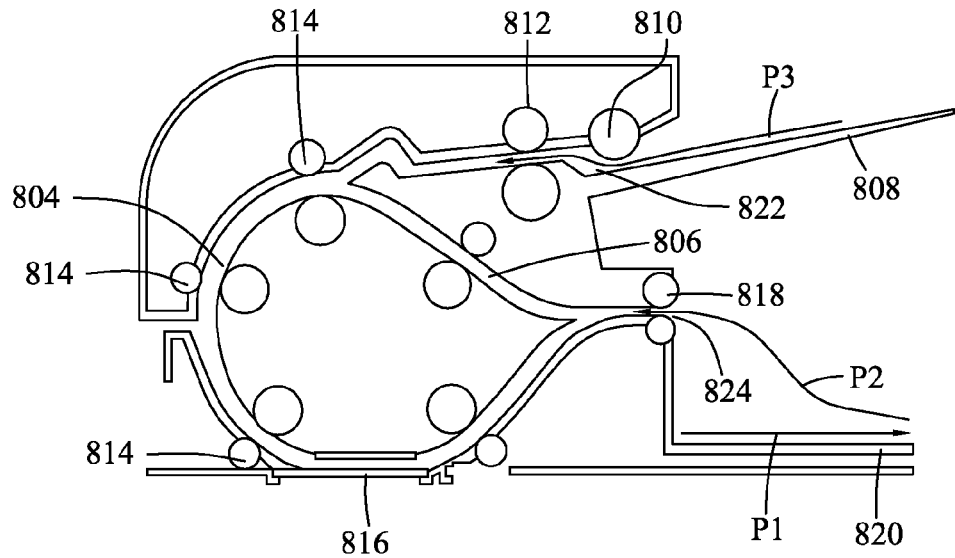
Figure 38:
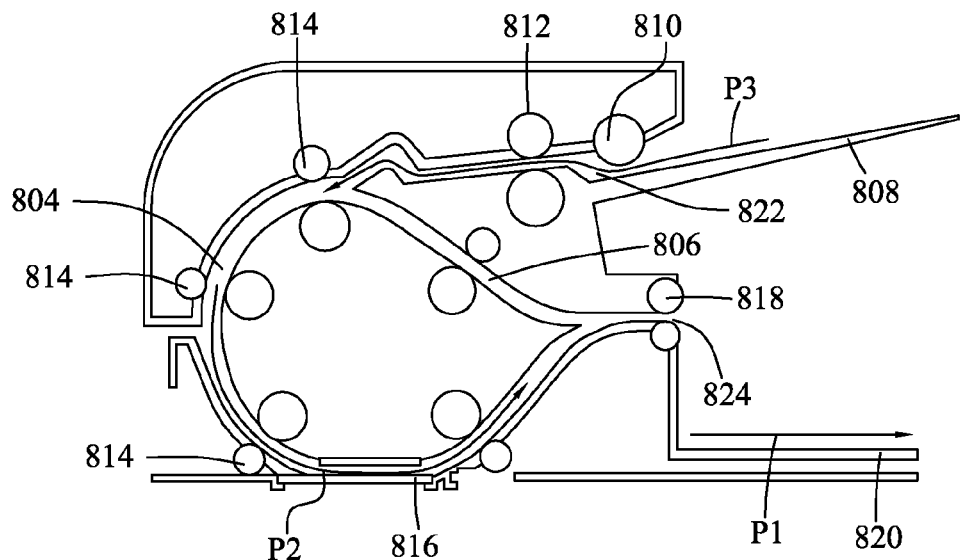
Figure 39:
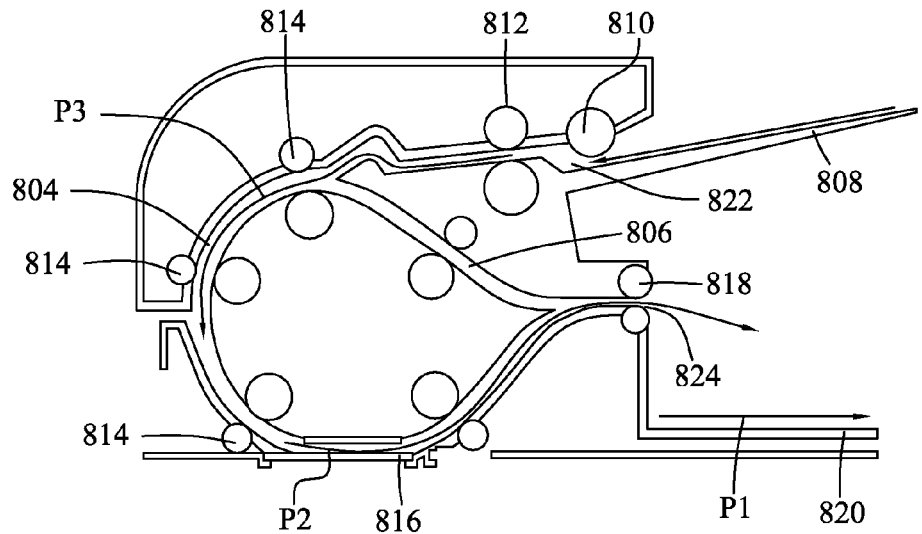
Figure 40:
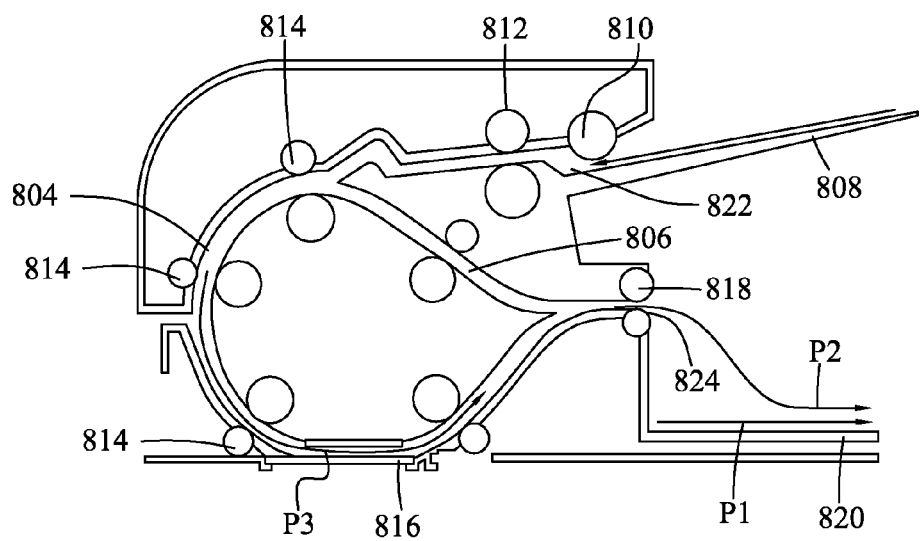
Figure 41:
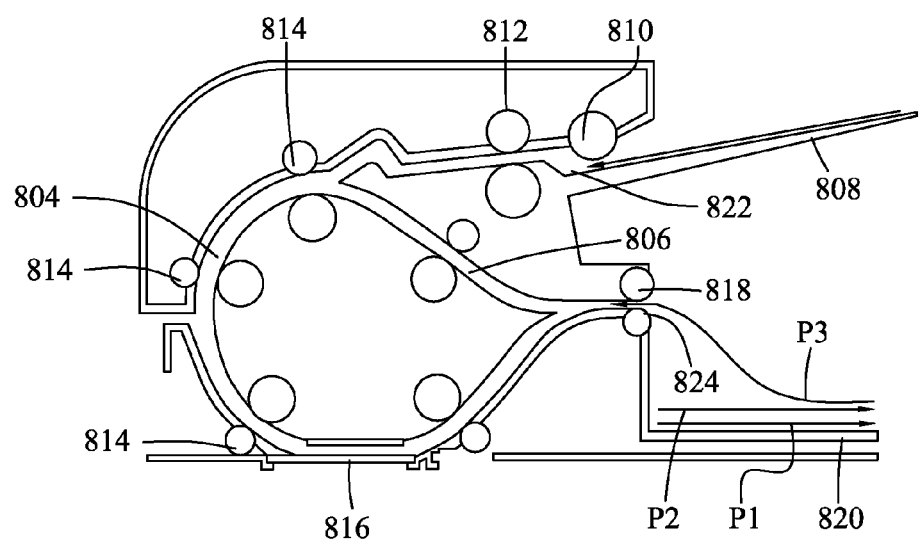

Please refer to FIG. 1 to FIG. 19. A method of conveying documents is applied to an ADF 200. The ADF 200 can be applied to various image processing products such as scanners, printers, copiers, etc. The ADF 200 includes a case 202, a conveying path 204, an inverting path 206, a feeding tray 208, a picking up roller 210, a separating roller 212, a plurality of conveying path rollers 214, an inverting path roller 216, a scanning section 218, a discharging roller 220 and a discharging tray 222.

The conveying path 204 is defined in the case 202 and includes an upstream feeding section 224 and a downstream discharging section 226 respectively connected to the outside of the case 202. The inverting path 206 is also defined in the case 202, which branches from the downstream discharging section 226 and merges to a position G of the conveying path 804 where positioned a downstream position relative to the separating roller 212 and arranged between the separating roller 212 and the scanning section 218. The scanning section 218 is positioned at one side of the conveying path 204 and between the merging position G and the downstream discharging section 226. The inverting path 206 and a portion of the conveying path 204 are together formed of a loop.

The feeding tray 208 is positioned at the outside of the case 202 and adjacent to the upstream feeding section 224 for being stacked a bundle of documents P1, P2, P3, P4. The picking up roller 210 is positioned in the case 202 and at the upstream feeding section 224 for picking up a top document P1 of the documents P1, P2, P3, P4 from the feeding tray 208 and conveying the document P1 into the conveying path 204.

The separating roller 212 is positioned at the upstream feeding section 224 and at a downstream position relative to the picking up roller 210. The separating roller 212 includes an active separating roller 228 and a driven separating roller 230 for separating the documents P1, P2, P3, P4 and conveying the documents P1, P2, P3, P4 one by one to the scanning section 218. Especially, the driven separating roller 230 can be replaced by a separating pad (not shown in figures).

The conveying path rollers 214 are distributed along the conveying path 204 for conveying the documents P1, P2, P3, P4 from the upstream feeding section 224, through the scanning section 218 and to the downstream discharging section 226. The scanning section 218 is positioned between the upstream feeding section 224 and the downstream discharging section 226 for scanning the documents P1, P2, P3, P4.

The discharging roller 220 includes an active discharging roller 228 and a driven discharging roller 230 positioned at the downstream discharging section 226 for discharging the documents P1, P2, P3, P4 from the conveying path 204 or conveying the documents P1, P2, P3, P4 from the downstream discharging section 226 to the inverting path 206. The inverting path roller 216 is positioned in the inverting path 206 for conveying the documents P1, P2, P3, P4 from the converting path 206 to the conveying path 204 through the merging position G.

The discharging tray 222 is positioned at the outside of the case 202 and adjacent to the downstream discharging section 226 for being stacked the scanned documents P1, P2, P3, P4. Especially, the discharging tray 222 is positioned below the feeding tray 208. The method of conveying the documents P1, P2, P3, P4 for the ADF 200 includes the following steps:

Step 102: Stacking the documents P1, P2, P3, P4 on the feeding tray 208 (shown in FIG. 1);

Step 104: Picking up the document P1 from the feeding tray 208 by the picking up roller 210 and conveying the document P1 into the conveying path 204 by the separating roller 212 positioned at the upstream feeding section 224 (shown in FIG. 2);

Step 106: Conveying the document P1 from the upstream feeding section 224 to the scanning section 218 by the conveying rollers 214, meanwhile, picking up the document P2 from the feeding tray 208 by the picking up roller 210 and conveying the document P2 into the upstream feeding section 224 of the conveying path 204 by the separating roller 212 (shown in FIG. 3);

Step 108: Conveying the document P1 to pass through the scanning section 218 for scanning a front surface of the document P1, meanwhile, retaining the document P2 in the upstream feeding section 224 and at an upstream position relative to the merging position G by the counterclockwise rotation of one of the conveying path rollers 214 adjacent to the merging position G (shown in FIG. 4);

Step 110: Conveying the document P1 from the scanning section 218 to the discharging roller 220 positioned at the downstream discharging section 226 by the conveying path rollers 214, and discharging a leading end of the document P1 from the downstream discharging section 226 of the conveying path 204 by the clockwise rotation of the discharging roller 220, meanwhile, conveying the document P2 to the scanning section 218 through the merging position G by the conveying path rollers 214 after a trailing end of the document P1 has arrived at the scanning section 218 (shown in FIG. 5);

Step 112: Clipping the trailing end of the document P1 by stopping rotating of the discharging roller 220, meanwhile, conveying the document P2 to arrive at the scanning section 218 by the conveying path rollers 214 (shown in FIG. 6);

Step 114: Conveying the document P1 from the downstream discharging section 226 to the inverting path 206 for inverting the document P1 and arranging the leading of the document P1 to become the trailing end, and the front surface to become a rear surface by the counterclockwise of the discharging roller 220, and then spacing the active discharging roller 228 from the driven discharging roller 230 after the document P1 has arrived at the inverting path roller 216, meanwhile, conveying the document P2 to pass through the scanning section 218 for scanning the a front surface of the document P2 (shown in FIG. 7);

Step 116: Conveying the document P1 from the downstream discharging section 226 through the inverting path 206 and to the merging position G of the conveying path 204 by the inverting path roller 216, meanwhile, conveying the document P2 from the scanning section 218 to the downstream discharging section 226 to discharge a leading end of the document P2 from the downstream discharging section 226 of the conveying path 204 by the conveying path rollers 214 to arrange the document P1 and document P2 at the downstream discharging section 226 according to separation of the active discharging roller 228 from the driven discharging rollers 230 (shown in FIG. 8);

Step 118: Conveying the document P1 to depart from the downstream discharging section 226 and arrive at the scanning section 218 though the inverting path 206 by the inverting path roller 216 and the conveying path rollers 214, meanwhile, arranging the active discharging roller 228 to abut the driven discharging roller 230 after the trailing end of the document P1 has departed from the downstream discharging section 226 for clipping a trailing end of the document P2 (shown in FIG. 9);

Step 120: Conveying the document P2 from the downstream discharging section 226 to the inverting path 206 and arranging the leading end of the document P2 to become the trailing end, and the front surface to become a rear surface by the counterclockwise rotation of the discharging roller 220, and then spacing the active discharging roller 228 from the driven discharging roller 230 after the leading end of the document P2 has arrived at the inverting path roller 216, meanwhile, conveying the document P1 to pass through the scanning section 218 again and to the downstream discharging section 226 for scanning the rear surface of the document P1 (shown in FIG. 10);

Step 122: Conveying the document P2 from the downstream discharging section 226 through the inverting path 206 and to the merging position G of the conveying path 204 by the inverting path roller 216, meanwhile, conveying the document P1 from the scanning section 218 to the downstream discharging section 226 for discharging the leading end of the document P1 from the downstream discharging section 226 by the conveying path rollers 214 to arrange the document P2 and document P1 at the downstream discharging section 226 according to the separation of the active discharging roller 228 from the driven discharging rollers 230 (shown in FIG. 11);

Step 124: Conveying the document P2 to depart from the downstream discharging section 226 and arrive at the scanning section 218 though the inverting path 206 by the inverting path roller 216 and the conveying path rollers 214, meanwhile, arranging the active discharging roller 228 to abut the driven discharging roller 230 after the trailing of the document P2 has departed from the downstream discharging section 226 for clipping the trailing end of the document P1 (shown in FIG. 12);

Step 126: Conveying the document P1 from the downstream discharging section 226 to the inverting path 206 and arranging the leading of the document P1 to become the trailing end, and the front surface to become the rear surface by the counterclockwise rotation of the discharging roller 220, and then spacing the active discharging roller 228 from the driven discharging roller 230 after the leading end of the document P1 has arrived at the inverting roller 216, meanwhile, conveying the document P2 to pass through the scanning section 218 again and to the downstream discharging section 226 for scanning the rear surface of the document P2 (shown in FIG. 13);

Step 128: Conveying the document P1 to depart from the downstream discharging section 226 and arrive at the scanning section 218 though the inverting path 206 by the inverting path roller 216 and the conveying path rollers 214, meanwhile, arranging the active discharging roller 228 to abut the driven discharging roller 230 after the trailing end of the document P1 has departed from the downstream discharging section 226 for clipping the trailing end of the document P2 (shown in FIG. 14);

Step 130: Conveying the document P2 from the downstream discharging section 226 to the inverting path 206 and arranging the leading end of the document P2 to become the trailing end, and the front surface to become the rear surface by the counterclockwise rotation of the discharging roller 220, and then spacing the active discharging roller 228 from the driven discharging roller 230 after the leading end of the document P2 has arrived at the inverting roller 216, meanwhile, conveying the document P1 to pass through the scanning section 218 again and to the downstream discharging section 226 for performing a non-scanning procedure of the front surface of the document P1 (shown in FIG. 15);

Step 132: Conveying the document P2 from the downstream discharging section 226 through the inverting path 206 and the merging position G to the conveying path 204 by the inverting path roller 216, meanwhile, conveying the document P1 from the scanning section 218 to the downstream discharging section 226 for discharging the leading end of the document P1 from the downstream discharging section of the conveying path 204 by the conveying path rollers 214 to arrange the document P1 and document P2 at the downstream discharging section 226 according to the separation of the active discharging roller 228 from the driven discharging rollers 230, meanwhile, picking up the document P3 from the feeding tray 208 by the picking up roller 210 and conveying the document P3 into the upstream feeding section 224 of the conveying path 204 by the separating roller 212 (shown in FIG. 16);

Step 134: Conveying the document P2 to depart from the downstream discharging section 226 and arrive at the scanning section 218 though the inverting path 206 by the inverting path roller 216 and the conveying path rollers 214, meanwhile, arranging the active discharging roller 228 to abut the driven discharging roller 230 to clip the document P1 and discharge the document P1 from the downstream discharging section 226 of the conveying path 204 by the clockwise rotation of the discharging roller 220, meanwhile, retaining the document P3 in the upstream feeding section 224 and at an upstream position relative to the merging position G by the counterclockwise rotation of the conveying roller 214 adjacent to the merging position G (shown in FIG. 17);

Step 136: Discharging the document P1 from the case 202 to be putted on the discharging tray 222, meanwhile, conveying the document P2 to pass through the scanning section 218 for performing a non-scanning procedure of the front surface of the document P2, meanwhile, retaining the document P3 in the upstream feeding section 224 and at an upstream position relative to the merging position G by the counterclockwise rotation of the conveying path rollers 214 adjacent to the merging position G (shown in FIG. 18);

Step 138: Discharging the document P2 from the case 202 for being putted on the document P1 at the discharging tray 22, meanwhile, conveying the document P3 from the upstream feeding section 224 to the scanning section 218 by the conveying path rollers 214, meanwhile, picking up the document P4 from the feeding tray 208 by the picking up roller 210 and conveying the document P4 into the upstream feeding section 224 of the conveying path 204 by the separating roller 212 (shown in FIG. 19); and Step 140: Returning to step 110 for performing the following-up procedures of the documents P3, P4.

As described above, the method of conveying the documents for the ADF 200 performs: a first conveying procedure to convey the documents from the upstream feeding section 224, through the scanning section 218 and to the downstream discharging section 226 for scanning the front surface of the documents, a first inverting procedure to convey the documents from the downstream discharging section 226, through the inverting path 206 and to the merging position G for inverting orientation of the documents, a second conveying procedure to convey the documents from the merging position G, through the scanning section 218 and to the downstream discharging section 226 for scanning the rear surface of the documents, a second inverting procedure to convey the documents from the downstream discharging section 226, through the inverting path 206 and to the merging position G for inverting the orientation of the documents again, and a third conveying procedure to convey the documents from the merging position G, through the scanning section 218 and to the downstream discharging section 226 for implementing a non-scanning process in order.

Since, a next document (document P2) begins with the first conveying procedure, after the preceding document (document P1) passes through the scanning section 218 during the first conveying procedure and before the preceding document (document P1) begins with the first inverting procedure. The next document (document P2) begins with the first inverting procedure and the second conveying procedure, after the preceding document (document P1) passes through the scanning section 218 during the second conveying procedure and before the preceding document (document P1) begins with the second inverting procedure.

The next document (document P2) begins with the second inverting procedure and the third conveying procedure, after the preceding document (document P1) passes through the scanning section 128 during the third conveying procedure and before the preceding document (document P1) has discharged from the case 202.

A next two document (document P3) begins with the first conveying procedure, after the next document (document P2) passes through the scanning section during the third conveying procedure and before the next document (document P2) has discharged from the ADF 200. A next three document (document P4) begins with the first conveying procedure, after the next two documents (document P3) begin with the first conveying procedure and before the next two documents (document P3) has discharged from the case 202. The following procedures of the documents P3, P4 are similar to the procedures of the documents P1, P2.

Especially, the conveying roller 214 positioned to adjacent to the merging position G can stop rotating for retaining the document P2 in the upstream feeding section 224 and at an upstream position relative to the merging position G in step 108. The active discharging roller 228 is moved downward to space from the driven discharging roller 230, and is moved upward to abut the driven discharging roller 230.

As described above, the next document (documents P2, P4) begins with the first conveying procedure, after the preceding document (documents P1, P3) begins with the first conveying procedure and before the preceding document (document P1, P3) begins with the first inverting procedure to shorten waiting time of the next document (documents P2, P4) in order to improve the efficiency and speed of the ADF 200.

Furthermore, the present invention is not limited to the embodiments described above; diverse additions, alterations and the like may be made within the scope of the present invention by a person skilled in the art. For example, respective embodiments may be appropriately combined.

What is claimed is:

1. A conveying method of a preceding document and a next document for an automatic document feeder having a case, a conveying path defining in the case and having an upstream feeding section and a downstream discharging section respectively connected to the outside of the case, an inverting path defining in the case and branching from the downstream discharging section and merging to a merging position where arranged at a downstream position relative to the upstream feeding section and adjacent to the upstream feeding section, a scanning section positioned at a side of the conveying path and between the merging position and the downstream discharging section, to perform three times the conveying procedures for conveying the preceding document and the next document from the merging position, through the scanning section and to the downstream discharging section and two times the inverting procedures for conveying the preceding document and the next document from the downstream discharging section, through the inverting path and to the merging position comprising:

beginning a first conveying procedure of the preceding document;

beginning a first conveying procedure of the next document after the preceding document passes through the scanning section during the first conveying procedure;

performing a first inverting procedure and then beginning a second conveying procedure of the preceding document during the first conveying procedure of the next document;

performing a first inverting procedure and then beginning a second conveying procedure of the next document during the second conveying procedure of the preceding document;

performing a second inverting procedure and then beginning a third conveying procedure of the preceding document during the second conveying procedure of the next document; and performing a second inverting procedure and then beginning a third conveying procedure of the next document during the third conveying procedure of the preceding document.

2. The conveying method as claimed in claim 1, further comprising beginning a first conveying procedure of the next-two document after the next document passes through the scanning section during the third conveying procedure and after the preceding document has discharged from the case through the downstream discharging section of the conveying path; and beginning a first conveying procedure of the next-three document after the next-two document passes through the scanning section during the first conveying procedure and after the next document has discharged from the case through the downstream discharging section of the conveying path.

3. The conveying method as claimed in claim 2, wherein the first conveying procedure of the next document begins when a trailing end of the preceding document arrives at the scanning section during the first conveying procedure of the preceding document.

4. The conveying method as claimed in claim 3, wherein the first inverting procedure of the preceding document begins when a leading end of the next document arrives at the scanning section during the first conveying procedure of the next document.

5. The conveying method as claimed in claim 4, wherein the second conveying procedure of the preceding document begins when a trailing end of the next document arrives at the scanning section during the first conveying procedure of the preceding document.

6. The conveying method as claimed in claim 5, wherein the first inverting procedure of the next document begins when a leading end of the preceding document arrives at the scanning section during the second conveying procedure of the preceding document.

7. The conveying method as claimed in claim 6, wherein the second conveying procedure of the next document begins when the trailing end of the preceding document arrives at the scanning section during the second conveying procedure of the preceding document.

8. The conveying method as claimed in claim 7, wherein the second inverting procedure of the preceding document begins when the leading end of the next document arrives at the scanning section during the second conveying procedure of the next document.

9. The conveying method as claimed in claim 8, wherein the second inverting procedure of the next document begins when the leading end of the preceding document arrives at the scanning section during the third conveying procedure of the preceding document.

\* \* \* \* \*